United States Patent [19]

Prus

[11] Patent Number: 4,811,906
[45] Date of Patent: Mar. 14, 1989

[54] ROTARY SPRAY HEAD SUITABLE FOR ELECTROSTATIC PAINTING

[75] Inventor: Eric Prus, Moirans, France

[73] Assignee: SAMES S.A., Meylan, France

[21] Appl. No.: 881,923

[22] Filed: Jul. 3, 1986

[30] Foreign Application Priority Data

Jul. 5, 1985 [FR] France .................. 85 10314

[51] Int. Cl.$^4$ .............................. B05B 5/00
[52] U.S. Cl. ................... 239/703; 239/700; 384/446
[58] Field of Search ............... 239/703, 700, 702, 701, 239/699; 384/446

[56] References Cited

U.S. PATENT DOCUMENTS 4,365,759 12/1982 Morishita et al. ............ 239/703
4,373,673 2/1983 Morishita et al. ............ 239/703
4,378,091 3/1983 Morishita et al. ............ 239/703

FOREIGN PATENT DOCUMENTS 0034254 8/1981 European Pat. Off. .
1613142 5/1970 Fed. Rep. of Germany .

OTHER PUBLICATIONS

J. P. Yonnet "Permanent magnet bearings and couplings", IEEE Transactions on Magnetics, vol. MAG—17, no. 1, Jan. 1981, pp. 1171–1172, section D; FIGS. 2–4.

Primary Examiner—Kenneth J. Dorner
Assistant Examiner—Gerald A. Anderson
Attorney, Agent, or Firm—Sandler & Greenblum

[57] ABSTRACT

A rotary spray head comprises a shaft in a longitudinal cavity in a body with spray means mounted on one end of the shaft and projecting axially from the body. At least one magnetic bearing is provided to support the shaft at least partially in the radial direction. The magnetic bearing comprises two magnetized annular parts respectively forming a stator and a rotor. These are in face-to-face relationship to each other so as to define between them an airgap occupying a plane substantially perpendicular to the main axis of symmetry of the shaft. They have respective main axes of symmetry coincident with that of the shaft.

23 Claims, 1 Drawing Sheet

ROTARY SPRAY HEAD SUITABLE FOR ELECTROSTATIC PAINTING

BACKGROUND OF THE INVENTION

1. Field of the Invention

The invention relates to a high-speed rotary spray head specifically usable for electrostatic spraying of paint or varnish; it is more particularly concerned with a new system of suspending the rotary shaft carrying the spray disk or cup.

2. Description of the Prior Art

There are known electrostatic paint application devices comprising a spray member in the shape of a disk or cup rotating at high speed and held at a high electrical voltage relative to ground. The liquid to be sprayed is deposited on the disk or in the cup and divided into fine particles as a result of the electrical and centrifugal forces applied to it. The charged particles are attracted by the structure to be covered, which is electrically grounded. The directional properties of the beam of particles may be enhanced by a ring of air jets to the rear of the spray member. To obtain a good surface finish on the structure it is essential to reduce the particle size as much as possible. Other things being equal, this means that it is necessary to increase the speed of rotation of the spray member. According to the type of spray head, this speed varies widely, between values in the order of 1000 and 100,000 rpm, for example.

In one well-known technique the shaft carrying the spray disk or cup is supported by ball or roller bearings. These procure both radial suspension of the shaft and its axial stabilization within the body of the spray head. Lubricated for life bearings limit the service life of the device to a few thousand hours.

Attempts have been made to lubricate permanently these bearings by means of a mist of oil mixed with air, in order to increase the service life. This type of arrangement raises the problem of avoiding any leakage of oil which could mix with the paint and spoil the finish of the painted surface, however.

Also, for a given system of lubrication the service life of the bearings is inversely proportional to the tangential speed of the mobile part of the bearing relative to its fixed part. It has therefore been necessary to reduce the diameter of the bearings and consequently that of the shaft driving the spray member. This approach encounters technological limits when high rotation speeds are to be obtained. Specifically, it becomes practically impossible to feed the product to be sprayed through an axial feed bore in a hollow shaft. For this reason lateral feed systems for the products to be sprayed have been proposed.

In the remainder of this description the term "bearing" will be used for any arrangement procuring (or contributing to the procurement of) suspension and radial guidance of the shaft and the term "thrust bearing" wil be used for any arrangement procuring axial positioning relative to the body of the spray head. Any bearing or thrust bearing is characterized by its stiffness which is the quotient of the force exerted on the shaft divided by the resulting displacement. The stiffness of ball and roller bearings is high and they can withstand considerable loads without significant displacement resulting. As the mechanical axis of the shaft is not always coincident with its principal axis of inertia, however, the resulting imbalances produce very high forces at the bearing races and the balls or rollers. Lubrication is seriously affected to the degree that in some cases these imbalances lead to rapid destruction of the bearings. Also, the bearing nearest the spray member is generally inadequately protected from atomized paint emitted in its proximity.

Attempts have recently been made in this art to eliminate roller bearings at least to some degree. Various systems have been put forward to fulfill the two essential functions of these bearings: suspension and radial guidance of the shaft, on the one hand, and axial positioning of the shaft within the body, on the other hand.

There is one known arrangement in which these two functions are implemented by fluidic bearings and by at least one fluidic thrust bearing. Gas, generally air, is injected under pressure between radial and axial bearing surfaces defined on the shaft and within the body of the spray head. This gas flow results in complete suspension of the shaft in the body, with which there is no direct mechanical rubbing contact. This reduces wear and makes it possible to rotate the shaft at high speed without it being necessary to reduce the diameter of the shaft. It is therefore possible to feed the product to be sprayed axially. For the system to be truly effective, however, the clearance between the fixed and rotating parts must be extremely small (in the order of a few microns). These parts therefore have to be machined particularly carefully. Also, the limited radial clearance available permits only small displacements of the shaft relative to its theoretical axis of rotation. The risks of contact between the shaft and the various bores in which it is accommodated are thus relatively high, especially if during use imbalances or instability and resonance phenomena occur. Finally, the air and therefore energy consumption are high, especially in connection with the fluidic bearings.

With specific relevance to the problem of radial suspension, another system as described in U.S. Pat. No. 4,378,091 proposes a combination of main fluidic bearings self-fed by natural aspiration of air and an auxiliary magnetic bearing. The function of a bearing of this kind is primarily to assist the fluidic bearings at low rotation speeds and to prevent contact between the parts on starting up and shutting down the device. In this magnetic bearing the magnetization is radial and the bearing is therefore implemented by two cooperating and interpenetrating magnets superposed radially. The low stiffness of the magnetic suspension cannot be exploited in a system of this kind to counter the instability phenomena mentioned above since there is a critical clearance where the fluidic bearings are concerned.

The present invention proposes an improvement on this arrangement associated with a new structure magnetic bearing.

SUMMARY OF THE INVENTION

The invention consists in a rotary spray head comprising a body, a longitudinal cavity in said body, a shaft in said cavity having a main axis of symmetry defining an axis of the spray head, drive means for rotating said shaft, spray means mounted on one end of said shaft to project axially from said body, means for axially stabilizing said shaft relative to said body, and at least one magnetic bearing adapted to support at least partially said shaft in the radial direction, said at least one magnetic bearing comprising two magnetized annular parts respectively constituting a stator and a rotor in face-to-face relationship to each other so as to define between them an airgap occupying a plane substantially perpendicular to said main axis of symmetry of said shaft and having respective main axes of symmetry coincident with that of said shaft.

In the previous paragraph the terms "rotor" and "stator" are merely used as a convenient way to distinguish between the mobile and fixed magnetized annular parts; nevertheless it is evident that in the embodiment to be described the magnetized parts do not have any motor function. In a preferred embodiment, the magnetized annular parts have two areas of opposed polarity: N-S in face-to-face relationship, so as to attract each other.

Thus with a magnetic bearing of this kind magnetized in the axial direction the low stiffness of this type of bearing may be exploited (eliminating the fluidic bearings) to counter imbalances and other disturbing phenomena since the length of the airgap conditioning the force of attraction between the two magnetized parts of the bearing is independent of the functional radial clearances between the rotor and the body on the one hand and between the stator and the shaft on the other hand. These functional clearances may be increased without affecting the quality of shaft suspension. The aforementioned axial stabilization means, several variations on which will be described below, make it possible to determine the length of the airgap between the two parts of the magnetic bearing and to maintain it at a constant value.

It is particularly advantageous to utilize a magnetic bearing of this kind in the vicinity of the end of the shaft carrying the spray member since the liquid sprayed by the disk or cup cannot affect the correct operation of this type of bearing. It is also at this location that sizable clearances are needed between the fixed and mobile parts since it is here that any eccentricities are likely to be of maximum amplitude.

In a first embodiment specifically adapted to high rotation speeds all of the suspension and radial guidance is provided by at least two similar magnetic bearings spaced axially from each other. The polepieces of these two bearings are disposed so as to generate opposite axial forces on the shaft, thus creating an unstable position of equilibrium for the shaft. In this case the axial stabilization means will preferably consist of a fluidic thrust bearing, known per se. The stiffness of a fluidic thrust bearing of this kind is significantly higher than would be achieved with a magnetic thrust bearing; it is therefore less exposed to the risk of contact between fixed and mobile parts. Also, it efficiently maintains the shaft in the vicinity of its unstable equilibrium position.

For a spray head operating at lower speeds it is equally possible to substitute for the magnetic bearing farthest from the spray member and the axial stabilization means a simple ball bearing, preferably a ball-and-socket or similar type bearing, having limited rotational capability so as to be able to tolerate any defect in the alignment of the shaft. This bearing then serves as the axial thrust bearing.

The invention will be better understood and other advantageous characteristics of the invention will emerge more clearly from the following description of a rotary spray head in accordance with the invention given by way of non-limiting example only and with reference to the appended drawings.

Figures 1, 2:
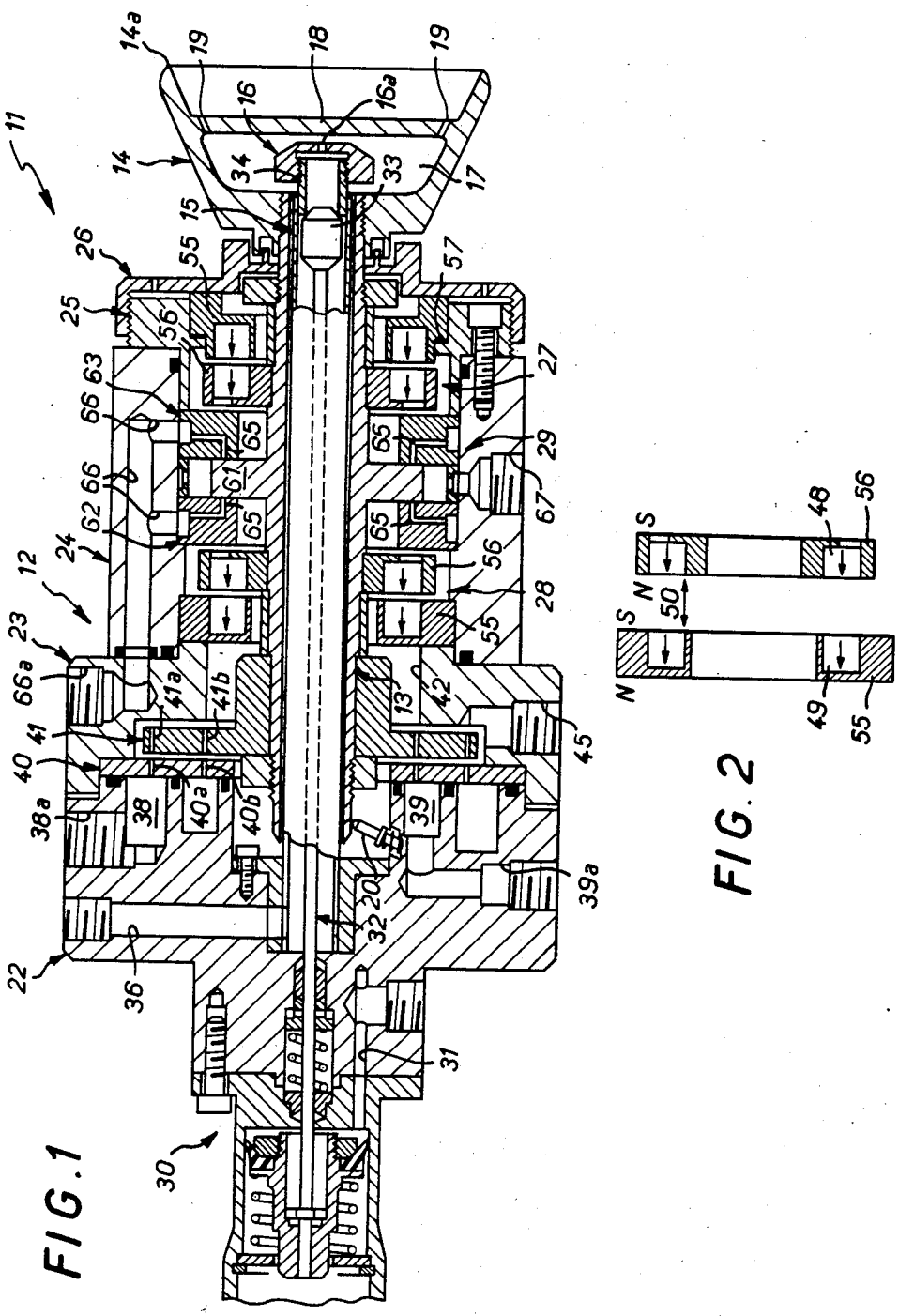
FIG. 1 is a view in longitudinal cross-section of a spray head in accordance with the invention.
FIG. 2 is a detailed view of the two component parts of a magnetic bearing in accordance with the invention.

Referring to the drawings, a spray head 11 comprises a body 12 housing a rotary shaft 13 and a spray member 14 in the form of a cup mounted at one axial end of the shaft 13 and projecting from the body 12. The shaft 13 comprises a longitudinal bore and is mounted coaxially with a longitudinal pipe 15 fastened to the body 12, through which the liquid to be sprayed (typically paint or varnish) is fed to an injector 16 discharging through an orifice 16a into the interior of a cavity 17 in the cup 14. One wall 18 of the cavity is provided with a series of orifices 19 arranged in a ring through which the liquid flows due to the centrifugal force produced by rotating the cup. The liquid thus reaches the spraying edge 14a of the cup. The shaft 13 and the cup 14 are of an electrically conductive material and are held at a high DC voltage by a carbon brush 20. This is held in contact with the surface of the shaft 13 by a spring system. The body 12 comprises a number of sleeves 22 through 26 assembled together axially by complementary shoulders and within which are defined cavities accommodating, inter alia, pneumatic drive means for rotating the shaft 13, two magnetic bearings 27, 28 and a fluidic axial thrust bearing 29 fed with compressed air. A pneumatic valve 30 is provided at the rear of the sleeve 22; it is supplied with compressed air by a bore 31 and controls the axial displacement of a rod 32 inserted in the pipe 15 and provided at one end with a needle 33 cooperating with an annular seat 34 on the injector 16, so that the product to be sprayed is only allowed to pass when the valve 30 is actually connected to a compressed air supply. The product to be sprayed is introduced into the pipe 15 through a radial hole 36 in the sleeve 22. This sleeve also comprises two annular grooves 38, 39 closed by a disk 40 inserted between the sleeves 22 and 23. This disk faces a turbine wheel 41 fastened to the shaft 13 and able to rotate freely in a cavity 42 in the sleeve 23. The grooves 38 and 39 communicate with respective bores 38a and 39a connected to compressed air supplies. The disk 40 and the turbine wheel 41 comprise two series of holes regularly distributed in the circumferential direction. The holes 40a in the disk communicate with the groove 38 and face holes 41a in the turbine wheel, whereas the holes 40b in the disk communicate with the groove 39 and face holes 41b in the turbine wheel. The holes in each circumferential series are inclined relative to the axis of rotation of the turbine wheel, the directions for the two series of holes being different so that the compressed air injected into the groove 38 rotates the turbine wheel 41 and the shaft 13 whereas the compressed air injected into the groove 39 brakes them. The drive means for rotating the shaft 13 which have just been described are conventional and do not constitute part of the invention. The cavity 42 is vented to atmosphere by a bore 45, to allow the driving air to exhaust freely.

In accordance with the invention, the shaft 13 is radially suspended at least partially by a first magnetic bearing 27 advantageously situated in the vicinity of the end of the shaft carrying the cup 14. In the example described this radial suspension is procured by two similar magnetic bearings 27 and 28 spaced axially from each other. Each bearing comprises two magnetized annular parts 48, 49 respectively forming a rotor (connectd to the shaft 13) and a stator (fixed inside the body 12), disposed in face-to-face relationship so as to define between them an airgap 50 occupying a plane substantially perpendicular to the main axis of symmetry of the shaft 13. With an arrangement of this kind in which the airgap in which the force suspending the shaft is created extends in a plane perpendicular to the shaft rather than in a space enveloping the shaft, it is possible as shown here to provide substantial functional clearance between the rotor and the body 12 on the one hand and between the stator and the shaft 13 on the other hand, permitting significant imbalances in operation.

In the example described the magnetized parts face each other through two areas of opposite polarity N-S which attract each other and their main axes of symmetry are substantially coincident with that of the shaft 13. They preferably have the shape of rings with plane axial surfaces so that each airgap defined between them is of constant length in the axial direction. Each magnetized annular part is housed in a stator cage 55 fixed to the inside of the body 12 or in a rotor cage 56 fixed to the shaft 13. This arrangement is important primarily for the rotor part because the cage then plays a protective role vis-à-vis the magnet, preventing it disintegrating due to centrifugal force.

A cage 55 or 56 comprises an open circular groove facing an analogous groove in the other cage of the magnetic bearing. The magnetized annular parts are accommodated in these grooves. Referring to FIG. 1, note that the stator cages of the two bearings are the furthest apart axially and that the rotor cages are the nearest together which, given the orientation of the magnetized parts in the cages, results in the two magnetic bearings developing opposite axial forces on the shaft 13, creating an unstable position of equilibrium for the shaft. This unstable position of equilibrium is obtained by means of shims 57 of adjustable thickness inserted between the stator cage 55 of the bearing 27 and a shoulder on the sleeve 25 which houses this cage.

The spray head is further provided with means for axially stabilizing the shaft relative to the body which, in the example being described, consists in an arrangement forming a fluidic thrust bearing 29 fed with compressed air. This axial thrust bearing, known per se, is situated between the two magnetic bearings 27 and 28. It comprises a ring 61 fastened to the shaft 13 and having parallel opposite sides facing which are two fixed walls 62, 63 each formed with a series of orifices 65 arranged in a circle and connected to bores 66 feeding pressurized fluid. Compressed air is introduced through an orifice 66a and flows on either side of the ring 61 before escaping to atmosphere, partially through an orifice 67 in the radial extension of this ring and partly through the spaces in which the magnetic bearings are accommodated.

The stiffness of the fluidic thrust bearing 29 procures good stability for the airgaps of the two magnetic bearings in operation. The axial thrust bearing thus contributes to the quality of the radial magnetic suspension. An axial thrust bearing of this type is also preferable to a low stiffness magnetic thrust bearing since the risks of contact between the fixed and mobile parts of the bearing are lower in this case.

As previously mentioned it is possible to determine other combinations combining low stiffness of the bearing (to accept significant imbalances) with high stiffness of the thrust bearing. Thus the axial thrust bearing 29 and the bearing 28 might be replaced by a ball-and-socket or analogous type bearing (not shown) mounted between the shaft 13 and the body 12 and preferably spaced axially from the bearing 27. The ball-and-socket type bearing could thus be disposed substantially in the position of the bearing 28, referring now to FIG. 1. As well as contributing to radial suspension of the shaft, it would axially stabilize the shaft and therefore the size of the airgap in the magnetic bearing 27.

I claim:

1. Rotary spray head comprising a body, a longitudinal cavity in said body, a shaft in said cavity having a main axis of symmetry defining an axis of the spray head, drive means for rotating said shaft, spray means mounted on one end of said shaft to project axially from said body, means for axially stabilizing said shaft relative to said body, a first magnetic bearing adapted to support said shaft in the radial direction, a second magnetic bearing axially spaced along said shaft from said first magnetic bearing, wherein each of said first magnetic bearing and said second magnetic bearing comprises two magnetized annular parts respectively constituting a stator and a rotor in face-to-face relationship to each other so as to define between them an air gap occupying a plane substantially perpendicular to said main axis of symmetry of said shaft and having respective main axes of symmetry coincident with that of said shaft, wherein the polepieces of said magnetic bearings being disposed so as to produce opposite axial forces on said shaft, thereby creating an unstable equilibrium position of said shaft, and wherein said shaft is entirely suspended radially by said magnetic bearings.

2. Rotary spray head according to claim 1, wherein said magnetized annular parts have two areas of opposite polarity in face-to-face relationship and attracting each other.

3. Rotary spray head according to claim 1, wherein said first magnetic bearing is near the end of said shaft carrying said spray means.

4. Rotary spray head according to claim 1, wherein said axial stabilizing means comprise an arrangement forming a fluidic axial thrust bearing.

5. Rotary spray head according to claim 4, wherein said fluidic thrust bearing comprises a ring fastened to said shaft with two parallel surfaces facing respective fixed parallel walls in which are formed two series of orifices arranged in a circle, and means for feeding pressurized fluid to said orifices.

6. Rotary spray head according to claim 1, wherein said axial stabilizing means comprise an arrangement forming a fluidic axial thrust bearing between said two magnetic bearings.

7. Rotary spray head according to claim 1, wherein said magnetized annular parts of said magnetic bearings are each in the shape of a ring with plane axial surfaces.

8. Rotary spray head according to claim 7, wherein said magnetized annular part forming a rotor is housed in a generally disk-shaped cage fastened to said shaft and coaxial therewith, said cage comprising a circular groove having an open side facing towards said stator in which said magnetized annular part forming a rotor is accommodated to prevent it disintegrating due to the effect of centrifugal force.

9. Apparatus comprising:
a shaft;
a support for rotatably supporting said shaft about a longitudinal axis;

means connected to said support for limiting axial displacement of said shaft relative to said support;

a first magnetic bearing and an axially spaced second magnetic bearing for entirely supporting said shaft in a radial direction; said first and second magnetic bearings each comprising:

a stator member connected to said support and having at least a first magnetized annular portion substantially concentric with said longitudinal axis;

a rotor member connected to said shaft and having at least a second magnetized annular portion substantially concentric with said longitudinal axis;

whereby said first and second magnetized annular portions have respective surfaces adjacent each other which are substantially perpendicular to said axis, wherein said first magnetic bearing and said second magnetic bearing are arranged to produce opposite and substantially equal axial forces on said shaft, thereby maintaining said shaft in substantial equilibrium.

10. Apparatus according to claim 9, further comprising a rotary spray head connected to one end of said shaft.

11. Apparatus according to claim 10, wherein said means for limiting axial displacement of said shaft is a high stiffness bearing and at least said first magnetic bearing is a low stiffness bearing, whereby at least said first magnetic bearing is adapted to permit eccentric rotation of said shaft due to imbalances and resonance phenomena during rotation of said shaft.

12. Apparatus according to claim 10, wherein said respective adjacent surfaces define an air gap therebetween of a predetermined axial dimension.

13. Apparatus according to claim 12, wherein said means for limiting axial displacement of said shaft is arranged to maintain said predetermined axial dimension substantially constant.

14. Apparatus according to claim 10, wherein said means for limiting axial displacement of said shaft comprises a fluidic axial thrust bearing.

15. Apparatus according to claim 9, wherein said respective adjacent surfaces define an air gap therebetween of a predetermined axial dimension.

16. Apparatus according to claim 15, wherein said means for limiting axial displacement of said shaft is arranged to maintain said predetermined axial dimension substantially constant.

17. Apparatus according to claim 9, wherein said means for limiting axial displacement of said shaft comprises a fluidic axial thrust bearing.

18. Apparatus according to claim 9, wherein said means for limiting axial displacement of said shaft is a high stiffness bearing and at least said first magnetic bearing is a low stiffness bearing, whereby at least said first magnetic bearing is adapted to permit eccentric rotation of said shaft due to imbalances and resonance phenomena during rotation of said shaft.

19. Apparatus comprising:

a shaft;

a support for rotatably supporting said shaft about a longitudinal axis;

means connected to said support for limiting axial displacement of said shaft relative to said support;

a first magnetic bearing and an axially spaced second magnetic bearing, said magnetic bearings at least partially supporting said shaft in a radial direction; said magnetic bearings comprising:

a stator member connected to said support and having at least a first magnetized annular portion substantially concentric with said longitudinal axis;

a rotor member connected to said shaft and having at least a second magnetized annular portion substantially concentric with said longitudinal axis;

whereby said first and second magnetized annular portions have respective surfaces adjacent each other which are substantially perpendicular to said axis, wherein said first magnetic bearing and said second magnetic bearing are arranged to produce opposite and substantially equal axial forces on said shaft, thereby maintaining said shaft in substantial equilibrium, and wherein at least one of said first magnetic bearing and said second magnetic bearing further comprises, on at least one of said support and said shaft, a shoulder, and a complementary shoulder on either said stator or said rotor, adapted to permit insertion of shims to adjust the relative axial positions of said support and said stator or said shaft and said rotor, whereby said respective adjacent surfaces of said first and second magnetized annular protions are thereby adapted to be adjustably spaced from each other.

20. Apparatus of claim 19, further comprising a rotary spray head connected to one end of said shaft.

21. Apparatus comprising:

a shaft;

a support for rotatably supporting said shaft about a longitudinal axis;

means connected to said support for limiting axial displacement of said shaft relative to said support;

a first magnetic bearing and an axially spaced second magnetic bearing, said magnetic bearings at least partially supporting said shaft in a radial direction; said at least one magnetic bearing comprising:

a stator member connected to said support and having at least a first magnetized annular portion substantially concentric with said longitudinal axis;

a rotor member connected to said shaft and having at least a second magnetized annular portion substantially concentric with said longitudinal axis;

whereby said first and second magnetized annular portions have respective surfaces adjacent each other which are substantially perpendicular to said axis, wherein said first magnetic bearing and said second magnetic bearing are arranged to produce opposite and substantially equal axial forces on said shaft, thereby maintaining said shaft in substantial equilibrium, and wherein said means for limiting axial displacement of said shaft is located axially between said two magnetic bearings.

22. Apparatus according to claim 21, wherein said means for limiting axial displacement of said shaft comprises a fluidic axial thrust bearing.

23. Apparatus of claim 21, further comprising a rotary spray head connected to one end of said shaft.

* * * * *